Patented June 19, 1951

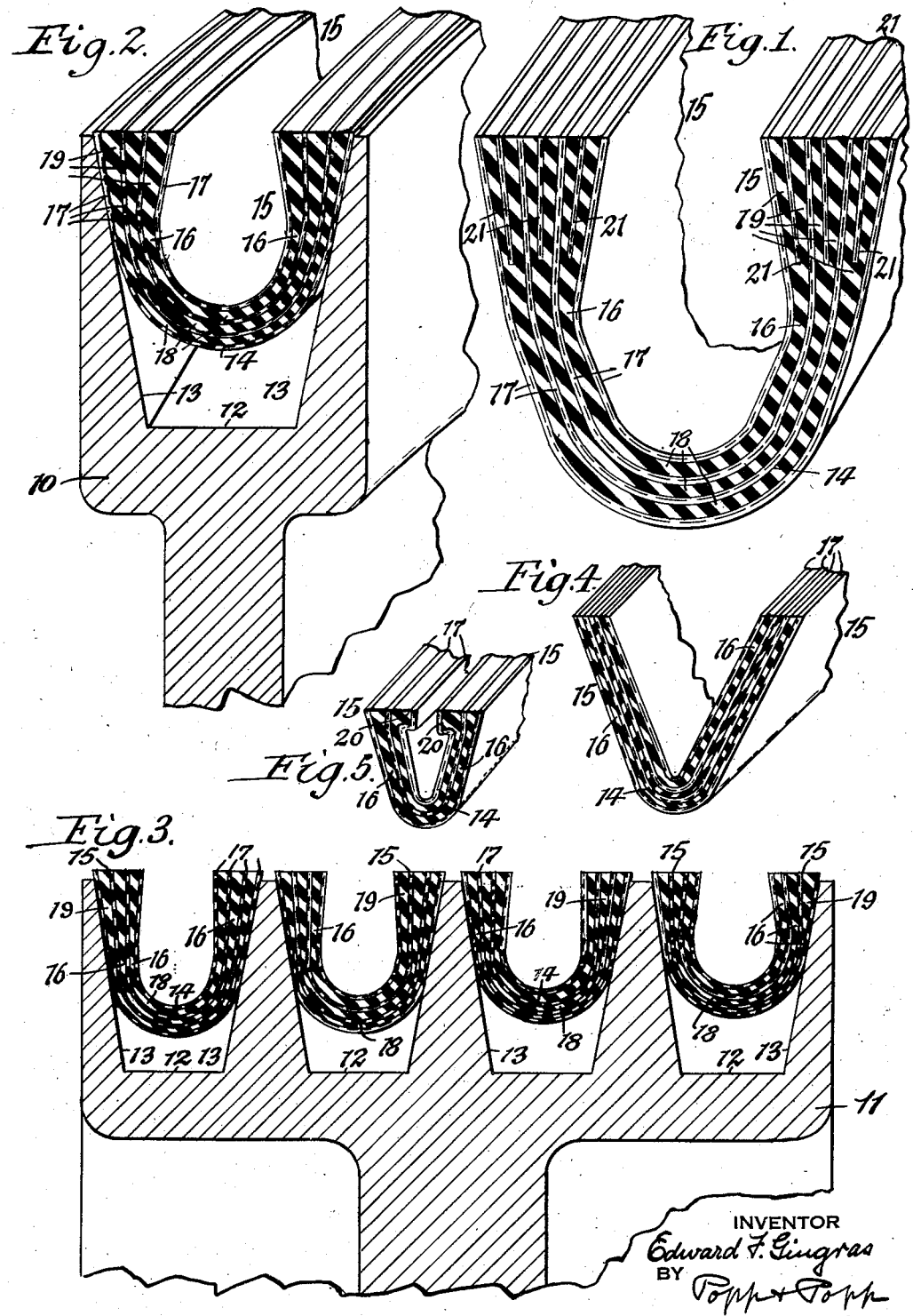

2,557,095

UNITED STATES PATENT OFFICE 2,557,095

DRIVING BELT

Edward F. Gingras, Buffalo, N. Y.

Application November 13, 1946, Serial No. 709,465

5 Claims. (Cl. 74—233)

This invention relates to a driving belt which is more particularly intended for use on a pulley provided on its periphery with a circumferential groove adapted to receive the belt, said groove being channel-shape in cross section with so as to produce a wedging engagement between these members.

Belts of this character, as heretofore constructed, were either solid or hollow both of which are unsatisfactory because a solid belt must be accurate as to length in order to secure the proper driving action without being too tight and producing excessive heat or too loose and producing slippage or ineffective driving, while the hollow belt is too soft and pliable and does not grip the pulley sufficiently firm to produce a reliable driving effect under all the pulling conditions to which the same may be subjected.

In cross section this belt has the general form of the letters V or U or the shape of a horse shoe but for convenience of description these several forms will hereinafter be referred to as of channel shape.

It is the object of this invention to provide a resilient hollow belt of channel-shape in cross section which is resistive to flexure in cross section but sufficiently strong to effectively transmit power from one pulley to another without requiring the belt to be unduly tight, which will yield sufficiently to permit of drawing the belt down in the groove of the pulley without causing the same to be excessively heated while in use and which will expand sufficiently to insure a firm driving engagement of the belt on the pulley when the belt is comparatively loose and thus avoid slippage and undue wear of the belt.

In the accompanying drawings:

Fig. 1 is a fragmentary sectional perspective view of one form of channel-shape driving belt embodying this invention.

Fig. 2 is a similar view showing a somewhat modified form of this belt engaging with the V-shaped circumferential groove of a pulley.

Fig. 3 is a fragmentary cross section of the rim of a pulley provided on its periphery with a plurality of circumferential grooves each of which is engaged by a driving belt constructed in accordance with the form of invention shown in Fig. 2.

Fig. 4 is a sectional perspective view of a channel-shape belt embodying another modified form of this invention.

Fig. 5 is a cross sectional perspective view showing a further modification of this improved belt.

The improved driving belt which is made in accordance with this invention runs in an annular groove extending circumferentially around the periphery of the rim of a pulley. Fig. 2 shows a pulley of this character having the periphery of its rim 10 provided with a single annular groove of V-shape cross section while Fig. 3 shows the rim 11 of the pulley provided with four annular grooves of V-shape cross section arranged concentrically side by side. Each of these grooves is preferably provided with an inner cylindrical bottom 12 and two inclined side walls 13 which diverge outwardly from opposite sides of the bottom to the periphery of the rim.

In general this improved driving belt has a body of channel-shape in cross section forming an inner transverse turn or web 14 and two side walls or wings 15 having their inner edges connected with opposite edges of said turn and diverging outwardly therefrom in generally acute angular relation to each other. This belt is constructed of resilient material which while resistive to transverse flexure will permit the wings to contract when the pull on the belt is strong enough to draw the same into the narrow inner part of the groove of the pulley and cause this body to move outwardly in the groove and spread its wings upon reducing the pull on the belt, thereby maintaining the wings constantly in firm gripping engagement with the side walls of the groove regardless of whether the pull on the belt is heavy or light. This is particularly important when a plurality of channel-shape belts are employed for transmitting power from one plural-grooved pulley to another of like character, inasmuch as each belt is capable of automatically adapting itself to the respective grooves of the pulleys and thus obtain a uniform traction of the belts regardless of minor differences in the length of the same.

In the preferred construction of the belt the same comprises a plurality of layers 16 of rubber which are substantially channel-shaped in cross section and a plurality of layers 17 of textile fabric which are also of channel-shape in cross section and alternate with the layers of rubber. In Fig. 1, six layers of rubber are employed which alternate with several layers of textile fabric while in Figs. 2, 3 and 4 three layers of rubber are used and these alternate with four layers of textile fabric and in Fig. 5 two layers of rubber alternate with three layers of textile fabric.

The rubber is preferably of such consistency that the same is relatively hard so that it normally tends to assume a chanel-shape when not subjected to any side pressure and thereby cause the wings of the body when drawn inwardly in the respective groove to be contracted or moved toward each other and when the body is moved outwardly in the groove the wings are spread or expanded, so that in all radial positions of the belt in the pulley groove the wings will firmly contact the walls of the groove and maintain a good traction effect between the same. The position of the parts of the channel shaped belt when moved radially in the V-groove of a pulley is indicated by the showing in Fig. 3 in which each of the four like belts occupies a position different from the other belts and thus indicates how a plurality of belts of different lengths produce a uniform traction effect. The inward movement of the belt in the groove is produced when the belt is relatively tight and the outward movement of the same in the groove occurs when the belt is comparatively loose, but in either case the wings contact the groove wall with sufficient pressure to maintain a good driving effect without causing any appreciable heating of the belt, thereby prolonging its usefulness and reducing the cost of maintenance.

In the construction shown in Fig. 4, the wings of the belt and the turn connecting the wings are of the same thickness throughout the entire area of the same which causes the resilience to be uniform in all parts of the belt. It is preferable however to make the turn of the belt somewhat more flexible so that the wings can move readily toward and from each other and also make the wings stiffer so that the same will bear more firmly against the walls of the pulley groove and obtain the maximum traction effect thereon. For this purpose the turn of the belt is made comparatively thin and the upper edges of the wings are made thicker than the turn, as shown in Figs. 1, 2, 3 and 5. This is accomplished in the construction shown in Figs. 1, 2 and 3 by making the several layers of textile fabric of uniform thickness throughout the entire area of each of these layers but each layer of rubber has its turn portion 18 made relatively thin while the upper edge portion 19 in each of the wings is made of upwardly enlarging form, thereby causing the wing portions of the rubber layers in each wing of the belt to diverge upwardly and the upper parts of the layers in each wing to fan out and widen the upper edge portion of each wing relatively to the turn of the belt.

In the construction shown in Figs. 1, 2 and 3 the upward enlargement of each wing of the belt is gradual but in the construction shown in Fig. 5 the enlargement is concentrated on the inner side of the upper edge of each wing in the form of a longitudinal rib or head 20.

In this construction these ribs not only increase the stiffness of the upper edges of these wings but these ribs also serve as stops which are adapted to engage each other and limit the extent of movement of the opposing upper parts of the wings toward each other, thereby causing the wings to be firmly held against the walls of the pulley groove and maintain the required driving engagement therewith without making the belt unduly tight.

If desired an auxiliary strip 21 of textile fabric may be embedded lengthwise in the thickened upper part of the rubber layer in each of the wings, as shown in Fig. 1, thereby further stiffening and strengthening these parts of the belt and increasing these parts and increasing its effectiveness and durability.

This belt is not only superior in its driving effect and capable of transmitting power efficiently without undue heating or wearing but the same can also be manufactured economically and at low cost in accordance with standard methods now in common use.

In referring to textile fabric as the layers which are used alternately in forming the body of this belt, it is to be understood that the same includes material of any suitable fibrous character such as cotton, rayon, fiberglass and the like.

Instead of using rubber for the layers which alternate with the layers of textile fabric any other suitable resilient material may be used such as neoprene and analogous gums having similar qualities. The term "rubber" as used in the accompanying claims is therefore meant to include such springy plastic materials capable of uniting fabric layers and resistive to flexure whether natural or artificial in origin.

Moreover, the fabric layers may be impregnated with the desired amount of rubber, neoprene or the like so that when assembled, resilient layers will be formed between adjacent layers of fabric.

I claim as my invention:

1. A driving belt which is adapted to engage with the sides of a V-groove on a pulley, comprising a plurality of united alternate laminae of strips of fabric and rubber running lengthwise and transversely of the belt, said strips of rubber and fabric being deformed to provide a central longitudinal portion running longitudinally of the belt and a pair of spaced side walls extending from the opposite edges of said circular longitudinal portion in generally acute angularly divergent relation to each other to provide a body having an outer face which is wedge-shaped in cross section generally to conform to said V-groove of said pulley and an internal unfilled groove running lengthwise of said belt and bounded by said circular longitudinal portion and side walls, said laminae of rubber and fabric coacting to render said side walls resistive to inward flexure and to yieldingly retain said side walls spaced a substantial distance from each other and permit movement of said side walls toward and from each other under varying driving loads and pressures of said belt against said pulley.

2. A driving belt having a body of channel shape in cross section throughout its length, said body comprising a pair of spaced side walls connected by a circular longitudinal portion to provide an unfilled groove between said side walls running lengthwise of the belt, the outer surfaces of said side walls diverging outwardly from connection with said circular longitudinal portion in acute angular relation to each other, and said body further comprising a series of alternately arranged and united laminations of fabric and rubber layers extending the length of said belt and following the channel shaped contour of said body, said layers of rubber and fabric coacting to render said side walls resistive to inward flexure.

3. A driving belt having a body of channel shape in cross section throughout its length, said body comprising a pair of spaced side walls connected by a circular longitudinal portion to provide an unfilled groove between said side walls running lengthwise of the belt, the outer surfaces of said side walls diverging outwardly from connection with said circular longitudinal portion in acute angular relation to each other, and said body further comprising a series of alternately arranged and united laminations of fabric and rubber layers extending the length of said belt and following the channel shaped contour of said body, said layers of rubber and fabric coacting to render said side walls resistive to inward flexure, and said layers of rubber and fabric all extending from the outer edges of one of said side walls, around said circular longitudinal portion and to the outer edge of the other of said side walls.

4. A driving belt which is adapted to engage with the sides of a V-groove on a pulley, comprising a plurality of united alternate laminae of strips of fabric and rubber running lengthwise and transversely of the belt and each lamina being of substantially uniform thickness throughout its width and extending from one longitudinal edge of said belt to the opposite longitudinal edge thereof, said strips of rubber and fabric being deformed to provide a central longitudinal portion running longitudinally of the belt and a pair of spaced side walls extending from the opposite edges of said circular longitudinal portion in generally acute angularly divergent relation to each other to provide a body having an outer face which is wedge-shaped in cross section to conform generally to said V-groove of said pulley and an internal unfilled groove running lengthwise of said belt and bounded by said circular longitudinal portion and side walls, said laminae of rubber and fabric coacting to render said side walls resistive to inward flexure and to yieldingly retain said side walls spaced a substantial distance from each other and permit movement of said side walls toward and from each other under varying driving loads and pressures of said belt against said pulley.

5. A driving belt having a body of channel shape in cross section throughout its length, said body comprising a pair of spaced side walls connected by a circular longitudinal portion to provide an unfilled groove between said side walls running lengthwise of the belt, the outer surfaces of said side walls diverging outwardly from connection with said circular longitudinal portion in acute angular relation to each other, and said body further comprising a series of alternately arranged and united laminations of fabric and rubber layers extending the length and breadth of said belt and following the channel shaped contour of said body, said layers of rubber and fabric coacting to render said side walls resistive to inward flexure, and at least one of said layers of rubber being of gradually increasing thickness toward the longitudinal edge of each of said side walls to render the edges of these side walls thicker than the parts thereof connected with said circular longitudinal portion.

EDWARD F. GINGRAS.

REFERENCES CITED

The following references are of record in the file of this patent:

UNITED STATES PATENTS

| Number | Name | Date |
|---|---|---|
| 2,033,697 | Farmer | Mar. 10, 1936 |
| 2,430,328 | Daniels | Nov. 4, 1947 |

FOREIGN PATENTS

| Number | Country | Date |
|---|---|---|
| 13,282 | Great Britain | 1891 |
| 6,890 | Great Britain | 1905 |